3,471,461
CATALYST FOR THE POLYMERIZATION OF CONJUGATED DIOLEFINS
Erik Tornqvist, Roselle, N.J., assignor to Esso Research and Engineering Company, a corporation of Delaware
No Drawing. Filed Nov. 2, 1964, Ser. No. 408,405
Int. Cl. C08d *1/14;* B01j *11/84*
U.S. Cl. 260—94.3                                   11 Claims

ABSTRACT OF THE DISCLOSURE

Conjugated diolefins such as butadiene and piperylene are polymerized with a catalyst system made up of either a titanium trichloride or tribromide, a Group III–IV metal iodide and a Group I–III alkyl or alkyl metal hydride.

---

The present invention relates to catalyst systems and their use for the formation of polymers of conjugated diolefins. More particularly, the invention deals with the polymerization of conjugated diolefins with a catalyst system made up of a titanium compound having a valence less than 4, a Group III–IV metal iodide and a Group I–III metal alkyl.

The polymerization of conjugated diolefins with various types of catalyst systems is well known in the art. Prior methods for the formation of polydiolefins have involved the use of catalyst systems made up of titanium tetrachloride, lithium aluminum alkyls and free iodine or an alkyl iodide as is disclosed in German Patents Nos. 1,157,787 and 1,157,788. Additionally, stereoregular polydiolefins have been formed with catalyst systems wherein a titanium iodide compound is a major ingredient (see Belgian Patents Nos. 629,626 and 631,730).

Now, in accordance with this invention, it has been found that tough, elastic materials having molecular weights in excess of 200,000 that are soluble in most organic solvents and free of crosslinking can be prepared with a catalyst system made up of a titanium tri- or dihalide, a Group III–IV metal iodide and a Group I–III metal alkyl or alkyl metal hydride.

Suitable conjugated diolefins useful for the preparation of the stereoregular, high molecular weight polymers of the invention include straight and branched chain aliphatic conjugated diolefins having preferably from 4 to 8 carbon atoms, and more preferably, from 4 to 5 carbon atoms. Representative non-limiting examples of useful $C_4$ to $C_8$ aliphatic conjugated diolefins are: butadiene-1,3, pentadiene-1,3, isoprene, hexadiene-1,3, heptadiene-1,3, and octadiene-1,3. The preferred conjugated diolefins are butadiene-1,3 and pentadiene-1,3 also known as piperylene, because these materials are commercially available in large quantities at relatively low cost.

The solvents or diluents used in making the polymers of the present invention should be liquids at the conditions of temperature and pressure used in the polymerization reaction. Solvents suitable for use in the polymerization reaction include $C_4$ to $C_{10}$ saturated aliphatic hydrocarbons, such as butane, pentane, n-heptane, isooctane, n-decane, cyclohexane, methylcyclohexane, etc. The preferred solvents for use in the present polymerization process are aromatic compounds such as benzene, toluene, xylene, etc.

The catalyst system employed in preparing the polymers of this invention comprises at least three initial components; namely: a primary catalyst component, a dispersant medium, and a co-catalyst. The primary catalyst component is a reducible titanium chloride or bromide or a mixture of such compounds wherein the titanium is in a valence state of 3 or less. Particularly preferred catalyst components of this type are titanium trichloride, titanium tribromide, titanium trichloride cocrystallized with a Group I–III metal halide such as aluminum chloride, titanium dichloride and titanium dibromide.

The dispersant medium component of the present catalyst system is an iodide of a metal selected from Groups III–B and IV–B of the Extended Periodic Table of the Textbook of Chemistry, Mack et al., 2nd Edition, Ginn and Company, page 313, or a mixture of such iodides. Representative examples of useful metal iodides include $AlI_3$, $GaI_3$, $SnI_4$, and $InI_3$. Aluminum iodide is particularly preferred as the dispersant medium in the present catalyst composition.

The co-catalyst component of the catalyst system employed in this invention comprises a Group I–III metal alkyl or metal alkyl hydride. Particularly valuable as co-catalysts are the lower alkylaluminum compounds, especially trialkylaluminum compounds, lithium aluminum alkyl compounds, zinc alkyl compounds, as well as alkylaluminum hydrides, lithium aluminum alkyl hydrides, and zinc alkyl hydrides. The preferred co-catalysts are the trialkylaluminum compounds having from 2 to 6 carbon atoms per alkyl group, such as triethylaluminum, tripropylaluminum, triisobutylaluminum, and the like, as well as the lower dialkylaluminum compounds such as diethylaluminum hydride, dipropylaluminum hydride, and diisopropylaluminum hydride.

The primary catalyst component and the dispersant medium of the catalyst system are preferably intimately contacted with each other in an inert environment prior to their use in the polymerization reaction. This intimate contacting can be carried out either by fusing the catalyst dispersant medium mixture at a temperature above the melting point of the dispersant medium or by intensely milling the mixture for a period of time sufficient to cause substantial dispersion of the primary catalyst component in the dispersant medium.

The period of time needed for the latter operation will, of course, depend greatly upon the efficiency of the milling equipment. Thus, for ball mills employing steel balls as the grinding medium, a milling period of from 2 to about 10 days will usually be sufficient, while for ball mills employing less dense grinding media longer milling periods may be required for satisfactory results. Conversely, highly satisfactory results may be obtained in a much shorter period of time when mills are utilized in which centrifugal or other non-gravity force is allowed to act upon the grinding medium, as is the case in certain modern vibrating or swinging milling equipment.

The fused or ball milled mixture of primary catalyst component and dispersant medium is preferably mixed with the co-catalyst in an inert organic diluent prior to their use in the polymerization system. Alternatively, the fused or milled mixture and the co-catalyst can be mixed or added individually to the reactants in the absence of any diluents.

The molar ratio of dispersant medium to primary catalyst component can vary in the range of from about 0.5:1 to about 10:1, preferably 1:1 to 5:1. The molar ratio of alkyl groups in the co-catalyst to iodine atoms in the dispersant medium is of a critical nature and should be so adjusted that the ratio between the alkyl groups in the co-catalyst and the iodine atoms in the dispersant medium will be between about 1.4 and 3, preferably about 2, when the metal valance in the dispersant medium is 3, and between about 1.5 and 4.5, preferably about 2.3, when the metal valence in the dispersant medium is 4.

It has been found that if the molar ratio of alkyl groups in the co-catalyst to the iodine atoms in the dispersant medium is less than or greater than what is indicated by these two ranges, little or substantially no polymer is formed. Since trialkylaluminum is a very reactive compound, which readily reacts with numerous other compounds and elements, it may, of course, be possible to use catalyst systems in which the original alkyl to iodine ratio is higher than about 3 and 4.5, respectively, by adding a fourth reactive component which would partly remove or neutralize the catalytic influence of the excess trialkylaluminum. However, such systems, if at all practical, would fall within the scope of this invention. Likewise, when significant amounts of reactive impurities, such as water, alcohols and oxygen, are present in the system, the optimum alkyl/iodine ratio may be correspondingly higher.

The total amount of catalyst employed in the polymerization reaction varies with the choice of components of the catalyst system and with the type of monomer polymerized, but is generally in the range of from about 0.005 to about 0.3 wt. percent, preferably 0.01 to 0.1 wt. percent, based upon the total reaction mixture comprising the monomers to be polymerized and the reaction diluent.

The conditions at which the polymerization reaction is conducted can vary over a wide range. Generally, temperatures ranging from less than 0 to about 100° C. can be used; however, temperatures ranging from 15° to 70° C. are preferred. Pressures ranging from subatmospheric to about 10 atmospheres, depending upon the vapor pressures of the diolefin and diluent, can be employed in the polymerization reaction. The reaction times used in the formation of the preferred polymers depend in general upon the temperatures and catalyst concentrations used. Reaction times ranging from 5 minutes to 200 hours can be employed; however, it is more usual to use reaction times ranging from about 5 to 72 hours.

The reaction vessel used for the polymerization can be constructed of any material that is inert to the reactants used, and is capable of withstanding the operating pressures. Reactors made of glass, stainless steel and glass-lined steel may thus be used.

In a typical preferred embodiment of a complete polymerization procedure, a nitrogen blanketed reaction flask equipped with stirrer and reflux condenser is first charged with titanium trichloride and purified anhydrous aluminum iodide. The molar ratio of aluminum iodide to titanium trichloride can suitably vary from about 1:1 to 5:1. The glass reaction vessel is then heated to a temperature in the range of 280° to 320° C. which causes the aluminum iodide to melt at about 191° C., at which time stirring of the reaction mixture is commenced. After a period varying from about 2 to 10 hours, the heating of the reaction vessel is stopped, the mixture cooled and a solidified product is recovered in essentially quantitative yield.

The fusion product of titanium trichloride and aluminum iodide is then introduced to a reaction vessel containing benzene and is contacted with triethylaluminum. The molar ratio of triethylaluminum to aluminum iodide in the catalyst mixture is adjusted at a value of about 2.

The total catalyst mixture is then introduced into a glass reaction vessel containing a $C_4$ to $C_5$ conjugated diolefin in benzene, whereupon the total reaction mixture is agitated under the autogenous pressure of the monomer and diluent for a period ranging from 24 to 48 hours at a temperature varying from 25° to 60° C. In operating the polymerization process, in general, all of the diolefin may be present before the catalyst is added; alternatively, part or all of the diolefin may be added during the polymerization. This introduction may be continuous, or intermittent.

The amount of catalyst used for the formation of the polymers of the present invention varies from about 0.01 to 0.5 part of catalyst per 100 parts of monomer. Upon completion of the polymerization reaction, the polymerization catalyst is deactivated by the addition of a small quantity of lower alkanol. The polymer product is recovered from the reaction mixture by the use of lower alkanol precipitation or solvent evaporation.

The polymers of the present invention exhibit molecular weights ranging from 10,00 to 3,000,000, and are generally in excess of 200,000. Molecular weight of the polymers is determined by the method of Johnson and Wolfangel, Industrial Engineering Chemistry, 44, 752 (1952). In the case of polybutadienes, the polymers contain from about 40 to 99% cis-1,4-unsaturation. The polymers of this invention are rubbery in nature and may be cured to form highly useful rubbers. Any one of a wide variety of curing procedures may be employed, such as sulfur curing or free radical curing. Any of the procedures familiar to those skilled in the processing of established elastomers such as natural rubber, butadiene-styrene rubber (SBR), and butyl rubber are suitable.

The polydiolefins of this invention have many varied uses. They may be employed in the preparation of tires, inner tubes, hose and tubing, wire and cable coatings, as well as for a wide variety of coated or molded articles.

This invention and its advantages will be better understood by reference to the following examples:

EXAMPLE 1

A series of tests were made to illustrate the effectiveness of the catalyst system of the present invention for the polymerization of conjugated diolefins. In every instance, the test was carried out in a 1-liter glass reaction vessel which was agitated by being placed on a paddle wheel stirrer in a temperature controlled water bath.

The reaction system was made up of 500 mls. of benzene and 100 grams of conjugated diolefin. To this mixture of diluent and monomer was added the catalyst in the amounts specified in each of the runs. After the completion of the polymerization reaction, a small amount of dry isopropanol was added to the reaction vessel to deactivate the catalyst. Following the deactivation, the total contents of the reaction flask were poured into an excess of isopropanol.

In the runs wherein a fused catalyst component is specified as being used, the catalyst was prepared by fusing the primary catalyst component and the dispersant medium at the temperature specified for a period ranging from 0.4 to 50 hours. The results of the test are set forth in Table I below.

TABLE I

| | Run | | | | | |
|---|---|---|---|---|---|---|
| | 1 | 2 | 3 | 4 | 5 | 6 |
| Catalyst: | | | | | | |
| Type | $TiCl_3 \cdot 5AlI_3$ | $TiCl_3 \cdot 5AlI_3$ | $TiCl_3 \cdot 3AlI_3$ | $TiCl_3 \cdot 3AlI_3$ | $TiCl_3 \cdot 5AlI_3$ | $TiCl_3 \cdot 5AlI_3$ |
| Method of preparation | Fused Melt | Fused Melt | Dry Milled | Dry Milled | Dry Milled | Fused Melt |
| Temp. of preparation (°C.) | 320 | 320 | 25 | 25 | 25 | 320 |
| Ball mill time (days) | | | 7 | 7 | 6 | |
| Weight (mg.) | 270 | 137 | 162 | 81 | 140 | 274 |
| Ti halide content (mmols) | 0.125 | 0.0625 | 0.125 | 0.0625 | 0.25 | 0.125 |
| Activator: | | | | | | |
| Type | $Al(C_2H_5)_3$ | $Al(C_2H_5)_3$ | $Al(C_2H_5)_3$ | $Al(C_2H_5)_3$ | $Al(C_2H_5)_3$ | $Al(C_2H_5)_3$ |
| Weight (mg.) | 143 | 71.4 | 85.6 | 42.8 | 57 | 35.7 |
| Al compound/Ti compound (mole ratio) [a] | 15 | 15 | 9 | 9 | 3 | 7.5 |
| R/I ratio [c] | 2 | 2 | 2 | 2 | 2 | 0.5 |
| Diolefin type | Butadiene | Butadiene | Butadiene | Butadiene | Butadiene | Butadiene |
| Reaction conditions: | | | | | | |
| Temperature (°C.) | 25 | 25 | 25 | 25 | 60 | 25 |
| Run length (hrs.) | 48 | 48 | 48 | 48 | 24 | 48 |
| Results: | | | | | | |
| High mol. wt. polymer (g.) | 96.0 | 96.1 | 91.2 | 93.9 | 89.8 | 0 |
| Mol. wt. $\times 10^{-3}$ [b] | 300 | 200 | 580 | 1050 | 380 | |
| Unsaturation, percent of total: | | | | | | |
| Type I | 4.6 | 4.3 | 4.4 | 4.5 | 5.5 | |
| Type II, trans | 5.4 | 2.7 | 2.9 | 1.8 | 5.2 | |
| Type II, cis | 90.0 | 93.0 | 92.7 | 93.7 | 89.3 | |
| Gel, percent | 0 | 0 | 0 | 0 | | |
| 1,2 addition, percent | | | | | | |

| | Run | | | | | |
|---|---|---|---|---|---|---|
| | 7 | 8 | 9 | 10 | 11 | 12 |
| Catalyst: | | | | | | |
| Type | $TiCl_3 \cdot 5AlI_3$ | $TiCl_3 \cdot 5AlI_3$ | $TiCl_3 \cdot 5AlI_3$ | $TiCl_3 \cdot 5AlI_3$ | $TiCl_3 \cdot 5AlI_3$ | $TiCl_3 \cdot 3AlI_3$ |
| Method of preparation | Fused Melt | Fused Melt | Fused Melt | Fused Melt | Fused Melt | Fused Melt |
| Temp. of preparation (°C.) | 320 | 320 | 320 | 320 | 320 | 300 |
| Ball mill time (days) | | | | | | 0.3 |
| Weight (mg.) | 137 | 274 | 137 | 68 | 274 | 162 |
| Ti halide content (mmols) | 0.0625 | 0.125 | 0.0625 | 0.0313 | 0.125 | 0.125 |
| Activator: | | | | | | |
| Type | $Al(C_2H_5)_2Cl$ | $Al(C_2H_5)_3$ | $Al(C_2H_5)_3$ | $Al(C_2H_5)_3$ | $Al(C_2H_5)_3$ | $Al(C_2H_5)_3$ |
| Weight (mg.) | 75.4 | 71.4 | 107.1 | 53.6 | 286 | 386 |
| Al compound/Ti compound (mole ratio) [a] | 15 | 10 | 20 | 20 | 25 | 30 |
| R/I ratio [c] | 1.34 | 1 | 3 | 3 | 4 | 9 |
| Diolefin, type | Butadiene | Butadiene | Butadiene | Butadiene | Butadiene | Butadiene |
| Reaction conditions: | | | | | | |
| Temperature (°C.) | 25 | 25 | 25 | 25 | 25 | 60 |
| Run length (hrs.) | 48 | 48 | 48 | 48 | 48 | 24 |
| Results: | | | | | | |
| High mol. wt. polymer (g.) | 0 | 0 | 60.5 | 0.9 | 2.6 | 4.2 |
| Mol. wt. $\times 10^{-3}$ [b] | | | 730 | | | 26.3 |
| Unsaturation, percent of total: | | | | | | |
| Type I | | | 4.5 | | | 6.3 |
| Type II, trans | | | 1.6 | | | 9.9 |
| Type II, cis | | | 94.0 | | | 83.8 |
| Gel, percent | | | 0 | | | 0 |
| 1,2 addition, percent | | | | | | |

| | Run | | | | | |
|---|---|---|---|---|---|---|
| | 13 | 14 | 15 | 16 | 17 | 18 |
| Catalyst: | | | | | | |
| Type | $TiI_3$ | $TiI_3$ | $TiI_3$ | $TiCl_3 \cdot 2SnI_4$ | $TiCl_3 \cdot 2SnI_4$ | $\alpha\text{-}TiCl_3$ |
| Method of preparation | | | | Dry Milled | Fused Melt | |
| Temp. of preparation (°C.) | | | | 25 | 144 | |
| Ball mill time (days) | | | | 6 | 0.04 | 0 |
| Weight (mg.) | 53.6 | 53.6 | 107 | 352 | 176 | 39 |
| Ti halide content (mmols) | 0.125 | 0.125 | 0.25 | 0.25 | 0.125 | 0.25 |
| Activator: | | | | | | |
| Type | $Al(C_2H_5)_2I$ | $Al(C_2H_5)_2I$ | $Al(C_2H_5)_2I$ | $Al(C_2H_5)_3$ | $Al(C_2H_5)_3$ | $Al(C_2H_5)_2I$ |
| Weight (mg.) | 53 | 106 | 106 | 171 | 85.6 | 797 |
| Al compound/Ti compound (mole ratio) [a] | 2 | 4 | 2 | [d] 8 | [d] 8 | 15 |
| R/I ratio [c] | | | | 2.25 | 2.25 | |
| Diolefin, type | Butadiene | Butadiene | Butadiene | Butadiene | Butadiene | Butadiene |
| Reaction conditions: | | | | | | |
| Temperature (°C.) | 60 | 60 | 60 | 60 | 60 | 25 |
| Run length (hrs.) | 24 | 24 | 72 | 24 | 24 | 48 |
| Results: | | | | | | |
| High mol. wt. polymer (g.) | 2.1 | 0 | 0 | 85.9 | 47.6 | 0 |
| Mol. wt. $\times 10^{-3}$ [b] | | | | 180 | 640 | |
| Unsaturation, percent of total: | | | | | | |
| Type I | | | | 5.4 | 5.6 | |
| Type II, trans | | | | 6.8 | 1.8 | |
| Type II, cis | | | | 87.8 | 92.6 | |
| Gel, percent | | | | 0 | 0 | |
| 1,2 addition, percent | | | | | | |

Footnotes at end of table

TABLE I—Continued

| | Run | | | | | |
|---|---|---|---|---|---|---|
| | 19 | 20 | 21 | 22 | 23 | 24 |
| Catalyst: | | | | | | |
| Type | α-TiCl₃ | TiCl₃.AlI₃ | TiCl₃.2AlI₃ | TiCl₃.3AlI₃ | TiCl₃.3AlI₃ | TiCl₃.2SnI₄ |
| Method of preparation | | Dry Milled | Fused Melt | Fused Melt | Fused Melt | Fused Melt. |
| Temp. of preparation (° C.) | | 320 | 300 | 300 | 300 | 144 |
| Ball mill time (days) | 6 | | 0.4 | 0.3 | 0.3 | 0.04 |
| Weight (mg.) | 39 | 140 | 121 | 162 | 324 | 176 |
| Ti halide content (mmols) | 0.25 | 0.25 | 0.125 | 0.125 | 0.25 | 0.125 |
| Activator: | | | | | | |
| Type | Al(C₂H₅)₂I | Al(C₂H₅)₃ | Al(C₂H₅)₃ | Al(C₂H₅)₃ | Al(C₂H₅)₃ | Al(C₂H₅)₃ |
| Weight (mg.) | 797 | 57 | 57 | 86 | 343 | 86 |
| Al compound/Ti compound (mole ratio) ᵃ | 15 | 3 | 6 | 9 | 15 | 6 |
| R/I ratio ᶜ | | 2 | 2 | 2 | 3 | 2.25 |
| Diolefin, type | Butadiene | Piperylene | Piperylene | Piperylene | Piperylene | Piperylene. |
| Reaction conditions: | | | | | | |
| Temperature (° C.) | 25 | 60 | 60 | 60 | 60 | 60 |
| Run length (hrs.) | 48 | 48 | 48 | 48 | 48 | 48 |
| Results: | | | | | | |
| High mol. wt. polymer (g.) | 9.2 | 65.7 | 52.5 | 63.6 | 6.8 | 55.6 |
| Mol. wt.×10⁻³ ᵇ | 190 | 180 | 375 | 235 | 28.7 | 170 |
| Unsaturation, percent of total: | | | | | | |
| Type I | 4.3 | | | | | |
| Type II, trans | 3.7 | 72.8 | 75.5 | 67.6 | 87.5 | 63.3 |
| Type II, cis | 92.0 | 27.2 | 24.5 | 32.4 | 12.5 | 36.7 |
| Gel percent | 0 | 0 | | | | |
| 1,2 addition, percent | | 40 | 35 | 37 | | |

ᵃ Includes Al in both Al(C₂H₅)₃ and AlI₃.
ᵇ Inherent viscosity determined in toluene solution at 25° C.; MW determined from correlation of Johnson & Wolfangel, Ind. Eng. Chem., 44, 752 (1952).
ᶜ R/I designates the molar ratio of the moles of alkyl groups present in the activator to the moles of iodine atoms present in the dispersant medium.
ᵈ (Al+Sn)/Ti ratio.

The results of Runs 1 through 5 indicate that the titanium trichloride, aluminum iodide, triethylaluminum catalyst system of the present invention serves to promote high yields of cis-1,4-polybutadiene. In each of the first five runs the conversion of butadiene-1,3 to polybutadiene was in excess of about 90% and the polymer so formed had molecular weights of at least 200,000 and above.

Runs 6 through 12 illustrate the criticality of maintaining the molar ratio of the alkyl groups in the activator to the moles of iodine atoms in the dispersant medium when aluminum triiodide is the dispersant medium at a value between about 1.4 and 3. When the molar ratio of alkyl groups in the activator to iodine atoms in the aluminum iodide dispersant medium is less than or exceeds the range specified, substantially less high molecular weight polymer is formed.

Runs 13, 14, 15, 18 and 19 indicate that neither titanium triiodide nor titanium trichloride when activated with diethylaluminum iodide is equivalent to the catalyst system of the present invention for the polymerization of conjugated diolefins. In each of these runs, none or substantially no high molecular weight polymer was formed.

Runs 16 and 17 illustrate the applicability of stannic iodide for use as the dispersant medium in the catalyst system of the present invention. The catalyst mixture of titanium trichloride, stannic iodide and triethylaluminum served in promoting the formation of substantial quantities of high molecular weight polybutadiene.

Runs 20, 21, 22 and 24 illustrate the applicability of the catalyst system of the present invention for the polymerization of piperylene to high molecular weight polypiperylene having a high degree of trans-unsaturation and 1, 2 addition. Run 23 illustrates the criticality of maintaining the ratio of activator to dispersant medium at about 2 when piperylene is the monomer to be polymerized.

EXAMPLE 2

To illustrate the criticality of utilizing metal iodides as the dispersant medium in the catalyst system of the present invention, a series of polymerizations were conducted in which various aluminum halides were used as the dispersant media for titanium trichloride. A fusion of the titanium trichloride component and the aluminum halide was prepared by contacting the two components at a temperature above the melting point of the aluminum halide in a sealed tube inside a rocking steel bomb. When aluminum chloride was used as the dispersant medium, two such reaction periods were employed with intermediate grinding of the mixture with chrome alloy steel balls for 24 hours in order to secure thorough dispersion or co-crystallization of the compounds.

The fused titanium trichloride-aluminum halide mixture was then activated with an amount of triethylaluminum sufficient to secure a ratio of triethylaluminum to aluminum halide of about 2, whereupon the catalyst mixture was introduced into a reaction flask containing 100 grams of butadiene-1,3 and 500 mls. of benzene diluent. The catalyst, monomer and diluent were maintained at a temperature of 60° C. with stirring for a period of 24 hours. At the completion of the reaction period, the polymer produced was isolated from the reaction mixture with dry isopropyl alcohol, dried, weighed and analyzed for cis-1,4 unsaturation. The molecular weight of the product so formed was determined according to the method of Johnson and Wolfangel, Industrial Engineering Chemistry, 44, 752 (1952). Inherent viscosity measurements were made in toluene at 25° C. The results of the tests are set forth in Table II below.

TABLE II

| Titanium Component | | Yield, g. | Mol. wt. ×10⁻³ | Cis-1,4, percent |
|---|---|---|---|---|
| Composition | mmoles | | | |
| Run: | | | | |
| 1 | TiCl₃.2AlI₃ | 0.0625 | 83.7 | 920 | 93.2 |
| 2 | TiCl₃.2AlI₃ | 0.125 | 94.0 | 675 | 91.7 |
| 3 | TiCl₃.2AlI₃ | 0.25 | 94.3 | 385 | 88.1 |
| 4 | TiCl₃.2AlCl₃ | 0.125 | Trace | | |
| 5 | TiCl₃.3AlI₃ | 0.125 | 91.5 | 290 | 91.0 |
| 6 | TiCl₃.3AlBr₃ | 0.125 | 4.3 | 75 | 39.1 |
| 7 | TiCl₃.3AlCl₃ | 0.125 | 0.2 | | |

The results of the runs set forth in Table II above indicate that aluminum bromide and aluminum chloride are not suitable as dispersant media in the catalyst system of the present invention. In contradistinction, aluminum iodide serves to promote the formation of high yields of high molecular weight polybutadiene. Runs 4, 6 and 7 demonstrate that when aluminum chloride or aluminum bromide are used in conjunction with triethylaluminum and titanium trichloride, only small amounts of polybutadiene are produced and that the polymer formed has a relatively low molecular weight.

EXAMPLE 3

To demonstrate the criticality of the use of a titanium trihalide as a catalyst component in the instant three-component catalyst system, a series of butadiene polymerizations were conducted with other transition metal halides in combination with aluminum iodide and triethylaluminum. The transition metal halide-aluminum iodide mixtures were formed by steel ball milling the components for a period of 6 days at a temperature of about 25° C. Each of the catalyst mixtures was activated with an amount of triethylaluminum sufficient to obtain a molar ratio of triethylaluminum to aluminum iodide of about 2. The total catalyst mixture was then introduced into a 1-liter glass reaction vessel containing 100 grams of butadiene-1,3 and 500 mls. of benzene. The entire reaction mixture was maintained at a temperature of 60° C. with agitation for a period of 24 hours. At the completion of the reaction period, the polymer was isolated from the reaction mixture with dry isopropyl alcohol, dried, weighed, and tested for Type II cis unsaturation. The molecular weight of the polymer was determined according to the method enunciated in Example 1. The results of the test are set forth in Table III below.

TABLE III

| | $TiCl_3 \cdot AlI_3$ | $VCl_3 \cdot AlI_3$ | $CrCl_3 \cdot AlI_3$ |
|---|---|---|---|
| Transition Metal Component: | | | |
| $MCl_3 \cdot AlI_3$, mmoles [a] | 0.25 | 0.125 | 0.125 |
| $Al(C_2H_5)_3$, mmoles | 0.5 | 0.25 | 0.25 |
| R/I ratio [b] | 2 | 2 | 2 |
| Yield, g | 89.8 | Trace | 0 |
| Anaylses on Polymer: | | | |
| Mol. wt. $\times 10^{-3}$ | 380 | | |
| Type II cis unsaturation, percent | 89.3 | | |

[a] M stands for the transition metal.

[b] R/I designates the molar ratio of the moles of alkyl groups present in the activator to the moles of iodine atoms persent in the dispersant medium.

From the data set forth above, it is apparent that other transition metal chlorides such as vanadium trichloride and chromium trichloride are not equivalent to titanium trichloride in the catalyst composition of the present invention. Neither vanadium trichloride nor chromium trichloride when used in combination with aluminum iodide and triethylaluminum serves to form an appreciable yield of polybutadiene. In contrast, titanium trichloride in combination with an aluminum iodide dispersant medium and a triethylaluminum activator served to secure an 89.8% yield of polymer having a molecular weight of 380,000.

EXAMPLE 4

To demonstrate the curability of the polypiperylene polymers formed with the catalyst system of the present invention, two samples of polypiperylene having differing molecular weights and type and degree of unsaturation were compounded on a rubber roll mill with 50 grams of high abrasion furnace black, 1 gram of phenyl β-naphthylamine, 2 grams of stearic acid, 3 grams of zinc oxide, 1.75 grams of sulfur, 1 gram of N-oxydiethylene-2-benzothiazolesulfenamide, and 0.25 gram of di-2-benzothiazyl disulfide per 100 grams of polypiperylene. The stocks thus obtained were heated at a temperature of 307° F. for varying lengths of time in a mold to give cured rubbery slabs. The slabs were subsequently cut into standard dumbbells and tested under ASTM conditions of temperature and humidity on a Scott micro-tensile tester. The results of the tensile test for each of the two polypiperylene samples are set forth in Table IV below.

TABLE IV

| | Sample A | Sample B |
|---|---|---|
| Cure time: 10 min.: | | |
| Tensile, p.s.i | 3,030 | 2,750 |
| 200% modulus, p.s.i | 410 | |
| 300% modulus, p.s.i | | 930 |
| Elongation, percent | 840 | 770 |
| Cure time: 20 min.: | | |
| Tensile, p.s.i | 3,410 | 3,060 |
| 200% modulus, p.s.i | 930 | |
| 300% modulus, p.s.i | | 1,890 |
| Elongation, percent | 570 | 490 |
| Cure time: 30 min.: | | |
| Tensile, p.s.i | 3,450 | 3,080 |
| 200% modulus, p.s.i | 1,000 | |
| 300% modulus, p.s.i | | 2,020 |
| Elongation, percent | 490 | 430 |
| Polymer characteristics: | | |
| Mol. wt. $\times 10^{-3}$ | 375 | 290 |
| Type II trans-unsaturation, percent | 75.5 | 70.0 |
| 1,2-addition, percent | 35 | 38 |

The above data indicate that the polypiperylene samples formed with the catalyst system of the present invention are readily sulfur-cured to vulcanizates having moderately high tensile strengths. It should be recognized, of course, that the polypiperylene vulcanizate tensile strengths may be improved by blending the polymer with materials such as polybutadiene, styrene butadiene rubber, and natural rubber.

Further advantages of this invention will be apparent to those skilled in the art. Polymers of conjugated diolefins that are readily sulfur-curable can be conveniently and efficiently prepared with the catalyst system of the present invention. It is to be understood that this invention is not limited to the specific examples set forth herein, which have been offered merely as illustrations, and that modifications may be made without departing from the spirit and scope of the appended claims.

What is claimed is:

1. A catalyst system for the polymerization of conjugated diolefins which comprises an inorganic titanium halide compound, said titanium moiety having a valence less than 4, a Group III–B to IV–B inorganic metal iodide intimately contacted by fusing or intensely ball milled with said inorganic titanium halide, the molar ratio of inorganic metal iodide to inorganic titanium halide varying from about 0.5:1 to about 10:1, and a Group I–III metal activator compound selected from the group consisting of Group I–III metal alkyls and Group I–III metal alkyl hydrides, the molar ratio of alkyl groups in the activator compound to iodine atoms in the inorganic metal iodide varying from about 1.4:1 to 3:1 when the metal moiety of the inorganic metal iodide has a valence of 3 and from 1.5:1 to 4.5:1 when the metal moiety of the inorganic metal iodide has a valence of 4.

2. The catalyst system of claim 1 wherein said inorganic titanium halide compound is selected from the group consisting of titanium trichlorides, tribromides, dichlorides and dibromides.

3. The catalyst system of claim 1 wherein said Group I–III metal activator is an alkyl aluminum compound.

4. The catalyst system of claim 1 wherein said Group III–B to IV–B metal iodide is selected from the group consisting of $AlI_3$ and $SnI_4$.

5. The catalyst system of claim 1 wherein the inorganic titanium halide compound is titanium trichloride, the inorganic metal iodide is aluminum iodide, and the metal activator is triethyl aluminum.

6. The catalyst system of claim 5 wherein the molar ratio of alkyl groups in the triethyl aluminum to iodide atoms in the aluminum iodide is about 2:1.

7. A process for polymerizing conjugated diolefins which comprises contacting a $C_4$ to $C_8$ straight chain, conjugated diolefin in a hydrocarbon diluent with a polymerization catalyst comprising an inorganic titanium halide compound, said titanium moiety having a valence less than 4, a Group III–B to IV–B inorganic metal iodide intimately contacted by fusing or intensely ball milled with said inorganic titanium halide, the molar ratio of inorganic metal iodide to inorganic titanium halide varying from about 0.5:1 to about 10:1, and a Group I–III metal activator compound selected from the group consisting of Group I–III metal alkyls and Group I–III metal alkyl hydrides, the molar ratio of alkyl groups in the activator compound to iodine atoms in the inorganic metal iodide varying from about 1.4:1 to 3:1 when the metal moiety of the inorganic metal iodide has a valence of 3 and from 1.5:1 to 4.5:1 when the metal moiety of the inorganic metal iodide has a valence of 4, and recovering a polymerized polydiolefin from the polymerization reaction mixture.

8. The process of claim 7 wherein said Group I–III metal activator is a lower alkyl aluminum compound.

9. The process of claim 7 wherein said Group III–B to IV–B inorganic metal iodide is selected from the group consisting of $AlI_3$, $GaI_3$, $SnI_4$ and $InI_3$.

10. The process of claim 7 wherein the straight chain, conjugated diolefin has from 4 to 5 carbon atoms.

11. The process of claim 10 wherein the inorganic titanium halide compound is titanium trichloride, the inorganic metal iodide is aluminum iodide, and the metal activator is triethyl aluminum.

References Cited

UNITED STATES PATENTS

| Number | Date | Name | Class |
|---|---|---|---|
| 3,202,646 | 8/1965 | Naylor | 260—94.3 |
| 2,962,490 | 11/1960 | Edmonds et al. | 260—429 |
| 3,066,126 | 11/1962 | Porter et al. | 260—429 |
| 3,032,510 | 5/1962 | Tornqvist et al. | 260—429 |
| 3,067,189 | 12/1962 | Balas | 260—429 |
| 3,130,003 | 4/1964 | Tornqvist et al. | 260—429 |
| 3,136,747 | 6/1964 | Bonner | 260—429 |
| 3,172,881 | 3/1965 | Farrar et al. | 260—94.3 |
| 3,208,954 | 9/1965 | Rindtorff et al. | 260—429 |
| 3,245,975 | 4/1966 | Zelinski | 260—94.3 |
| 3,281,402 | 10/1966 | Zelinski | 260—94.3 |

JOSEPH L. SCHOFER, Primary Examiner
R. A. GAITHER, Assistant Examiner

U.S. Cl. X.R.
252—429